United States Patent [19]

Chauvier

[11] Patent Number: 4,570,660
[45] Date of Patent: Feb. 18, 1986

[54] VACUUM SLEEVE VALVE

[76] Inventor: Daniel J. V. D. Chauvier, P.O. Box 11325, Selcourt, Springs, Transvaal Province, South Africa

[21] Appl. No.: 666,965

[22] Filed: Oct. 31, 1984

[30] Foreign Application Priority Data

Nov. 11, 1983 [ZA] South Africa .................. 83/8433

[51] Int. Cl.⁴ .......................................... G05D 11/03
[52] U.S. Cl. .................................. 137/114; 137/508; 137/907
[58] Field of Search ............... 137/111, 114, 508, 526, 137/DIG. 8; 4/490; 251/61.1

[56] References Cited

U.S. PATENT DOCUMENTS

| | | | |
|---|---|---|---|
| 1,908,357 | 5/1933 | Hornbruch | 137/114 X |
| 2,638,107 | 5/1953 | Teague, Jr. | 137/114 X |
| 2,969,800 | 1/1961 | Skiruin et al. | 137/114 X |
| 4,378,254 | 3/1983 | Chauvier | 4/490 X |

*Primary Examiner*—Martin P. Schwadron
*Assistant Examiner*—Stephen M. Hepperle
*Attorney, Agent, or Firm*—Lester Horwitz

[57] ABSTRACT

A valve for controlling the flow of water to a filter of a swimming pool has a tubular member with a main inlet opening at one end connectable to a suction hose, an outlet opening at its other end connectable to a suction source, an auxiliary opening intermediate its ends and a communication opening also intermediate its ends. A sleeve is located about the tubular member to be slidable therealong and is positioned on one side of the communication opening. A flexible bellows is secured at one end to the sleeve and at its other to the tubular member on the other side of the communication opening to define a varible volume chamber in communication with the interior of the tubular member via the communication opening. A closure is located in the auxiliary opening and is fast with the sleeve to be slidable therewith. A spring urges the sleeve into a position in which the auxiliary opening is substantially closed.

9 Claims, 1 Drawing Figure

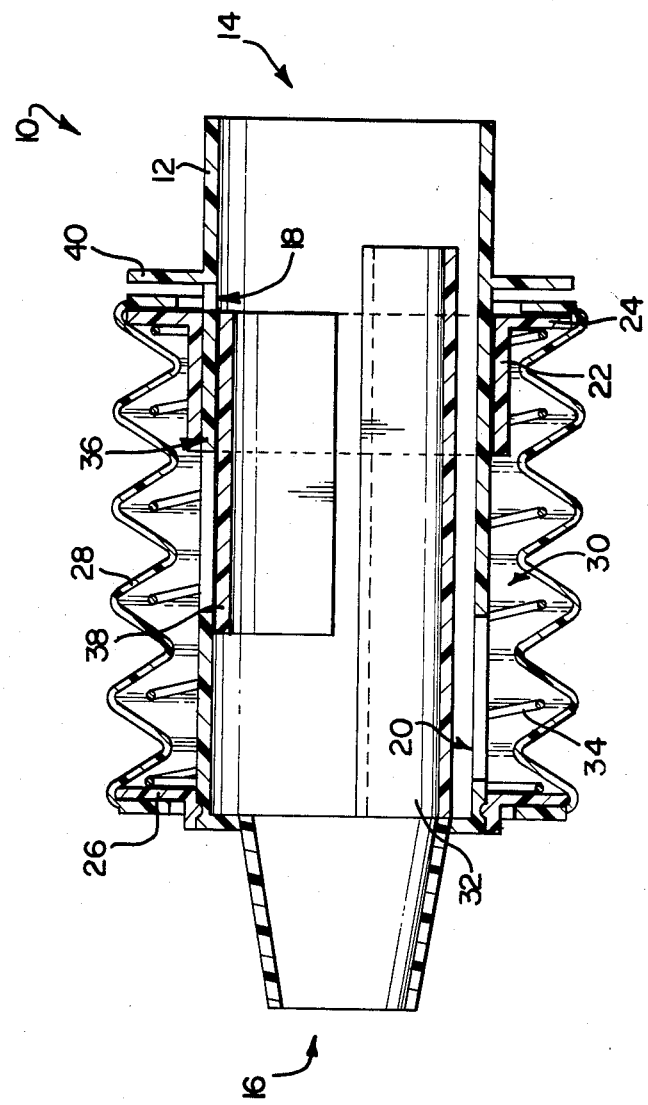

VACUUM SLEEVE VALVE

This invention relates to valves. It relates in particular to valves for use in swimming pools to connect a cleaning apparatus to a suction source.

There are presently available automatic apparatus for cleaning swimming pools. These apparatus are connected to a suction source, such as a pump, by means of a flexible hose. Further, these apparatus operate to clean the floor and in some cases also the walls of the swimming pools. As a result, water located at the bottom or sides of the swimming pool is sucked into the apparatus to be subsequently filtered by a filter associated with the pump. It is however desirable that the surface water also be drawn into the filtration system, in order to skim the surface of the swimming pool.

According to the invention there is provided a valve for controlling the flow of a fluid, which includes a tubular member having a main inlet opening at one end connectable to a suction hose, an outlet opening at its other end which is connectable to a suction source, an auxiliary opening intermediate its ends, and a communication opening also intermediate its ends;

a sleeve member located about the tubular member to be slidable therealong and positioned on one side of the communication opening and having fast therewith a closure element located in the auxiliary opening and being of a suitable size relative to the opening to be slidable therein such that the sleeve member and closure element are displaceable between a normal operative configuration in which a restricted aperture is provided and an open configuration in which a larger, substantially unrestricted aperture is provided;

a variable chamber defining means engaged with the sleeve member and with the tubular member at a position on the other side of the communication opening to the sleeve member to define an annular chamber about the tubular member that is in suction communication with the interior of the tubular member via the communication opening; and a bias means for biassing the sleeve into a position in which the auxiliary opening is substantially closed.

It will be appreciated, that preferably, the auxiliary opening is elongate and is disposed substantially longitudinally. The closure element is shorter than the auxiliary opening and may be about a third as long as the auxiliary opening. The auxiliary opening and the closure element will have substantially similar widths (i.e. circumferentially extending dimensions).

Although the auxiliary opening and the communication opening are preferably spatially separated they may be contiguous. Thus, the auxiliary opening and the communication opening may be parts of the same hole in the tubular member. Preferably, as indicated, the communication opening and the auxiliary opening are spatially separated. Thus, they may be angularly and longitudinally spaced.

The chamber defining means may comprise a tubular flexible element.

A baffle may be provided for shielding the communication opening from the interior of the tubular member. Similarly, a shroud member may be provided for effectively closing that portion of the auxiliary opening which communicates with the variable volume chamber from the interior of the tubular member. The shroud member may be located within the tubular member and may be slidable relative thereto, being fast with the closure element.

A stop member may be provided for limiting movement of the sleeve member. A securing ring may also be provided, fast with the tubular member at one end thereof, to which the flexible element is attached.

The invention is now described, by way of an example, with reference to the accompanying drawing which shows a longitudinal sectioned view of a valve in accordance with the invention.

Referring to the drawing, a valve for use with an automatic swimming pool apparatus to assist in skimming the surface of the swimming pool is designated generally by reference numeral 10. The device 10 has a tubular member 12 which defines an inlet 14 at one end and at its other end it defines an outlet 16. The inlet 14 is connectable to an end of a suction hose (not shown) and the outlet 16 is connectable to a suction source (also not shown). Intermediate its ends, the tubular member 12 has an auxiliary opening 18 and a communication opening 20. As shown, the auxiliary opening 18 and the communication opening 20 are diametrically opposed and are also longitudinally spaced, the auxiliary opening 18 being closer to the inlet end 14 and the communication opening 20 being close to the outlet end 16 of the tubular member 12. A sleeve 22 having a flange 24 is slidably mounted about the tubular member 12. A securing ring 26 is secured to the tubular member 12 close to its outlet end 16. A bellows-like flexible member 28, which is tubular, is secured at one end to the flange 24 and at its other end to the ring 26 to define an annular variable volume chamber 30 that is in communication with the interior of the tubular member 12 by means of the communication opening 20. A baffle 32 is mounted within the tubular member 12 to shield the communication opening 20. A stainless steel spring 34 biasses the sleeve 22 away from the ring 26.

A closure element 36 is located in the auxiliary opening 18. The closure element 36 is fast with the sleeve 22 to be slidable therewith. It will be understood that the closure element 36 is shorter than the auxiliary opening 18. Thus, as the sleeve 22 slides towards the ring 26 a greater opening is provided between the interior of the tubular member 12 and the exterior of the device. Further, as the sleeve 22 moves towards the ring 26 that portion of the auxiliary opening 18 located between the chamber 30 and the interior of the tubular member 12 will get smaller. In order to close off that portion of the auxiliary opening 18 that is in communication with the chamber 30, a shroud member 38 is provided that is fast with the closure element 36. A stop formation 40 limits displacement of the sleeve 22. When the sleeve abuts the stop formation 40, the auxiliary opening 18 is closed by the closure element 36 and the shroud member 38.

In use, when suction is applied to the end 16, water is caused to flow into the tubular member 12 through the inlet 14. As the pressure in the tubular member 12 is less than that outside, and as the chamber 30 is in communication with the interior of the tubular member 12, the sleeve 22 is forced to move towards the ring 26, compressing the spring 34 such that that portion of the auxiliary opening 18 that communicates with the exterior of the device 10 provides a restricted aperture. Water is accordingly drawn into the tubular member 12 through the restricted aperture thus causing skimming of the swimming pool. If a leaf or some other detritus should block the restricted aperture then the pressure differential between the inside of the tubular member 12 and the outside thereof will increase causing the chamber 30 to collapse further. This is effected by the sleeve 22 sliding further towards the ring 26 thereby increasing the size of that portion of the auxiliary opening 18 in communication with the exterior. This enables the leaf or other detritus blocking the restricted aperture to pass into the tubular member 12, therethrough and out through the outlet 16. Once the cause of the blockage has been removed the pressure differential decreases, the chamber 30 increases in size and the sleeve 22 moves towards the stop formation 40 thereby once more providing a restricted aperture.

I claim:

1. A valve for controlling the flow of a fluid, which includes
   a tubular member having a main inlet opening at one end connectable to a suction hose, an outlet opening at its other end which is connectable to a suction source, an auxiliary opening intermediate its ends, and a communication opening also intermediate its ends;
   a sleeve member located about the tubular member to be slidable therealong and positioned on one side of the communication opening and having fast therewith a closure element located in the auxiliary opening and being of a suitable size relative to the opening to be slidable therein such that the sleeve member and closure element are displaceable between a normal operative configuration in which a restricted aperture is provided and an open configuration in which a larger, substantially unrestricted aperture is provided;
   a variable chamber defining means engaged with the sleeve member, and with the tubular member at a position on the other side of the communication opening to the sleeve member, to define an annular chamber about the tubular member that is in suction communication with the interior of the tubular member via the communication opening; and
   a bias means for biassing the sleeve into a position in which the auxiliary opening is substantially closed.

2. The valve as claimed in claim 1, in which the auxiliary opening is elongate and is disposed substantially longitudinally, and the closure element is about as third as long as the auxiliary opening.

3. The valve as claimed in claim 1, in which the auxiliary opening and the communication opening are angularly and longitudinally spaced.

4. The valve as claimed in claim 1, in which the chamber defining means comprises a tubular flexible element.

5. The valve as claimed in claim 1, which includes a baffle located within the tubular member adjacent the communication opening.

6. The valve as claimed in claim 5, in which the communication opening is close to one end of the tubular member and the baffle extends from that end towards the other end of the tubular member.

7. The valve as claimed in claim 1, which includes a shroud located within the tubular member in alignment with the auxiliary opening and fast with the closure element for closing that portion of the auxiliary opening not closed by the closure element and through which there would otherwise be communication between the variable volume chamber and the interior of the tubular member.

8. The valve as claimed in claim 1, which includes a stop for limiting movement of the sleeve member.

9. The valve as claimed in claim 1, which includes a securing ring, fast with the tubular member at one end thereof, to which the flexible element is attached.

* * * * *